US011801912B2

(12) United States Patent
Costa

(10) Patent No.: US 11,801,912 B2
(45) Date of Patent: Oct. 31, 2023

(54) MOTORCYCLE SUSPENSION

(71) Applicant: Vince Costa, Anaheim, CA (US)

(72) Inventor: Vince Costa, Anaheim, CA (US)

( * ) Notice: Subject to any disclaimer, the term of this patent is extended or adjusted under 35 U.S.C. 154(b) by 226 days.

(21) Appl. No.: 17/500,715

(22) Filed: Oct. 13, 2021

(65) Prior Publication Data

US 2023/0116049 A1   Apr. 13, 2023

(51) Int. Cl.
| | |
|---|---|
| *F16F 9/44* | (2006.01) |
| *B62K 25/28* | (2006.01) |
| *B62K 21/08* | (2006.01) |
| *B62D 61/02* | (2006.01) |
| *F16F 9/04* | (2006.01) |
| *F16F 9/16* | (2006.01) |

(52) U.S. Cl.
CPC ............ *B62K 25/286* (2013.01); *B62K 21/08* (2013.01); *B62K 25/283* (2013.01); *B62D 61/02* (2013.01); *F16F 9/049* (2013.01); *F16F 9/0472* (2013.01); *F16F 9/16* (2013.01)

(58) Field of Classification Search
CPC .... B62K 25/286; B62K 21/08; B62K 25/283; B62D 61/02; F16F 9/0472; F16F 9/049; F16F 9/16; F16F 9/063; F16F 9/325
See application file for complete search history.

(56) References Cited

U.S. PATENT DOCUMENTS

| | | | | |
|---|---|---|---|---|
| 5,934,421 A * | 8/1999 | Nakadate | ................. | F16F 9/325 |
| | | | | 188/299.1 |
| 6,581,948 B2 * | 6/2003 | Fox | ......................... | F16F 9/096 |
| | | | | 280/276 |
| 7,261,194 B2 * | 8/2007 | Fox | ........................... | F16F 9/34 |
| | | | | 188/314 |
| 8,336,683 B2 * | 12/2012 | McAndrews | ........... | F16F 9/185 |
| | | | | 188/314 |
| 9,273,746 B2 * | 3/2016 | Chen | ........................ | F16F 9/466 |
| 9,500,254 B2 * | 11/2016 | McAndrews | ........... | F16F 9/504 |
| 9,963,191 B2 * | 5/2018 | McAndrews | ........... | F16F 9/504 |
| 10,919,597 B2 * | 2/2021 | Murakami | ........... | B60G 17/015 |
| 11,199,239 B2 * | 12/2021 | Dumitru | ................. | F16F 9/062 |
| 2003/0075402 A1 * | 4/2003 | Fox | ......................... | B62K 25/04 |
| | | | | 188/280 |
| 2003/0213662 A1 * | 11/2003 | Fox | ...................... | B62K 25/286 |
| | | | | 188/275 |
| 2009/0000886 A1 * | 1/2009 | McAndrews | ........... | F16F 9/504 |
| | | | | 188/275 |
| 2009/0000887 A1 * | 1/2009 | McAndrews | ........ | B62K 25/286 |
| | | | | 188/275 |
| 2010/0175959 A1 * | 7/2010 | Becker | ................. | B62K 25/286 |
| | | | | 188/322.13 |

(Continued)

*Primary Examiner* — Thomas W Irvin

(74) *Attorney, Agent, or Firm* — Clement Cheng

(57) ABSTRACT

A suspension unit has a piston assembly connected to an adjuster. The piston assembly has three or more concentric cylindrical bodies including: an outer tube; an inner tube, and a dampener rod. The dampener rod is inside and concentric to the inner tube. The outer tube is rigidly connected to the dampener rod. The inner tube is telescopically mounted to the outer tube. The inner tube is inside and concentric to the outer tube. The adjuster has an adjuster compression entry port. The axle clamp rebound port connects to an adjuster block rebound entry port. The adjuster block has a high-speed compression cavity formed on an end of the adjuster block.

20 Claims, 10 Drawing Sheets

(56) References Cited

U.S. PATENT DOCUMENTS

| | | | | |
|---|---|---|---|---|
| 2019/0178329 A1* | 6/2019 | Dumitru | ............ | F16F 9/16 |
| 2020/0216139 A1* | 7/2020 | Murakami | ............ | F16F 9/46 |
| 2020/0324852 A1* | 10/2020 | Kwaterski | ............ | B62K 23/06 |
| 2021/0214041 A1* | 7/2021 | Sullivan | ............ | F16F 9/061 |
| 2021/0239178 A1* | 8/2021 | Hovén | ............ | F16F 9/062 |
| 2023/0175573 A1* | 6/2023 | LaForge | ............ | F16F 9/063 |
| | | | | 267/221 |

* cited by examiner

MOTORCYCLE SUSPENSION

FIELD OF THE INVENTION

The present invention is in the field of motorcycle suspensions.

DISCUSSION OF RELATED ART

A variety of different vehicle suspensions have been made for allowing adjustability.

SUMMARY OF THE INVENTION

Generally, the suspension unit uses oil operating with mechanical parts to provide suspension to a vehicle. The suspension unit is connected to a motorcycle fork, wishbone suspension or other type of suspension mechanism. The term "rezy" is short for reservoir.

A suspension unit includes three or more concentric cylinders which include an outer tube 2; an inner tube 1 inside and concentric to the outer tube 2; and a dampener rod 3700 inside and concentric to the inner tube 1. A dampener rod piston 600 is formed at one end of the dampener rod 3700 and seals against the inside of the inner tube 1. The dampener rod piston 600 divides the internal volume of the inner tube 1 into the inner tube rezy 120, and the rebound chamber 300. A dampener rod seal 1071 is concentric to the inner tube and fits around the dampener rod such that it restricts the flow of fluid from the rebound chamber. The end of the outer tube 2 opposite the inner tube rezy 120 is capped by an axle clamp 1100. The axle clamp 1100 closes off the outer tube 2 and forms a compression chamber 100, between the dampener rod seal 1071 and the axle clamp 1100. The dampener rod seal restricts fluid flow between the compression chamber 100 and the rebound chamber 300, at the end of the dampener rod 3700 opposite the dampener rod piston 600 is the bottom out cone 7900. A dampener rod rebound passage 3752 is formed internal to the dampener rod 3700 and a port in the wall of the dampener rod forms a dampener rod inlet 3702 that connects the dampener rod rebound passage 3752 to the rebound chamber 300. A compression exit port 1161 passes from the compression chamber 100 out of the outer tube 2 and axle clamp 1100. The bottom out cone 7900 is fixed to the dampener rod 3700 and the bottom out cone 7900 is secured to the axle clamp 1100 by a bottom out cone retainer bolt 77. The dampener rod chamber 3751 is formed inside the inner bore of the dampener rod 3700 and bottom out cone 7900 and connects to the dampener rod rebound passage 3752. An axle clamp rebound port 1163 connects to the bottom out cone entry port 7902. A passage formed in the bottom out cone 7900 connects the dampener rod inner chamber 3751 to the axle clamp rebound port 1163.

The suspension unit optionally includes dampener rod 3700 with a dampener rod transfer chamber 3714 separate from the dampener rod rebound chamber 3752 and dampener rod chamber 3751. The dampener rod transfer chamber 3714 is connected at one end to the compression chamber 100 by the dampener rod inlet port 3702 which is a port in the wall of the dampener rod 3700. The dampener rod piston 600 has a cavity formed as a dampener rod piston chamber 641. At the cavity end closest to the inner tube rezy 120, a dampener rod piston plate 660 has openings for dampener rod piston ports 651. The other end of the dampener rod transfer chamber 3714 connects into the dampener rod piston chamber 641. Preferably formed as a thin disk washer, the dampener rod return valve 71 blocks flow through the dampener rod piston ports 651 from escaping the dampener rod piston chamber 641, while freely allowing fluid entrance from the inner tube rezy 120 to the dampener rod piston chamber 641.

Preferably, an over pressure port 675 is formed in the dampener rod piston plate 660 and an over pressure valve 678 covers the over pressure port 675 and is held in place by the over pressure bolt 676. The over pressure valve 678 allows very high pressure in the compression chamber 100 to escape through the dampener rod piston volume 641 into the inner tube rezy 120.

Preferably, the compression exit port 1161 connects to an adjuster block compression entry port 1101. The axle clamp rebound port 1163 connects to an adjuster block rebound entry port 1103. An adjuster block 1170 is preferably configured with a high-speed compression cavity 1121 formed on one end of an adjuster block 1170. The high-speed rebound cavity 1123 is cavity formed on another end of the adjuster block 1170. An adjuster volume 1151 is a cavity that that both the high-speed compression cavity 1121 and the high-speed rebound cavity 1123 connect into. The adjuster block compression entry port 1101 connects to the high-speed compression cavity 1121. An adjuster block rebound entry port 1103 connects to the high-speed rebound cavity 1123. A low-speed compression entry port 1102 connects the high-speed compression cavity 1121 to the low-speed compression cavity 1122. A low-speed rebound entry port 1104 connects the high-speed rebound cavity 1123 to the low-speed rebound cavity 1124. A low-speed return port 1141 connects to the adjuster volume 1151 and both the low-speed compression cavity 1122 and the low-speed rebound cavity 1124. Into the low-speed compression cavity 1122 is placed a low speed compression adjuster shaft 3502. The low speed compression adjuster shaft 3502 controls the flow of oil either by using a series of orifices, or by restricting the flow of oil via reducing the size of the orifice. The low-speed rebound cavity 1124 receives a low speed rebound adjuster shaft 3504. The low speed rebound adjuster shaft 3504 controls the flow of oil either by using a series of orifices, or by restricting the flow of oil via reducing the size of the orifice. A high-speed compression adjuster assembly 511 is placed in the high-speed compression cavity 1121. A high-speed rebound adjuster assembly 513 is placed in the high-speed rebound cavity 1123. Both the high-speed compression adjuster assembly 511 and high-speed rebound adjuster assembly 513 are similar in function and vary primarily in specification.

The high-speed compression adjuster assembly 511 has a high-speed compression adjuster shaft 3501 passes coaxially through a high-speed compression adjuster body 5101. The high-speed compression adjuster shaft 3501, has a means for turning it about its longitudinal axis on one end and threads along its mid-section. Threads engage threads within the high-speed compression adjuster body 5101. Fixed to the high-speed compression adjuster shaft 3501, on the end opposite the means for turning the adjuster shaft, is a high-speed compression valve spring 901. The high-speed compression valve spring 901 is pre-compressed more or less depending on the position of the high-speed compression adjuster shaft 3501 threads in the high-speed compression adjuster body 5101 threads.

On the other side of the high-speed compression valve spring 901, the high-speed compression valve spring 901 presses a high-speed compression exit valve 801 against an high-speed compression adjuster plate 601 over the high-speed compression adjuster chamber exit port 6175. The high-speed compression adjuster chamber exit port 6175 is in the center of an high-speed compression adjuster plate 601 formed on the end of the high-speed compression adjuster body 5101 furthest from the means for turning the high-speed compression adjuster shaft 3501. The high-speed compression adjuster body 5101 is internally threaded and the high-speed compression adjuster shaft 3501 is externally threaded so that the high-speed compression valve spring 903 pretension may be adjusted by the high-speed compression adjuster shaft 3501. When the high-speed compression adjuster shaft 3501 is rotated, the threads in the compression adjuster body 5101 cause the preload on the high-speed compression valve spring 901 to change.

A cavity allowing fluid flow is formed between the high-speed compression adjuster body 5101 and the high-speed compression adjuster plate 601 to create the compression adjuster chamber 6016. The compression adjuster chamber 6016 is bound on one side by the high-speed compression adjuster body 5101 and the other side by the high-speed compression adjuster plate 601. The high-speed compression adjuster plate 601 is a centrally placed high-speed compression adjuster chamber exit port 6175. One or more compression plate return ports 6151 are mounted around the outside of the high-speed compression adjuster plate 601.

A compression return valve 7111 seats inside the compression adjuster chamber 6016 and on the high-speed compression adjuster plate 601, blocking flow out of the compression adjuster chamber 6016 through the one or more compression plate return ports 6151. The compression return valve 7111 may be easily pushed back from the high-speed compression adjuster plate 601 to allow flow into the compression adjuster chamber 6016. The high-speed compression adjuster body 5101 has openings to allow fluids to transmit from the compression adjuster chamber 6016 to adjuster block compression entry port 1101 and low-speed compression entry port 1102.

Preferably, the high-speed rebound adjuster assembly 513 has a high-speed rebound adjuster shaft 3503 passing coaxially through a high-speed rebound adjuster body 5103. The high-speed rebound adjuster shaft 3503 has a means for longitudinal axis rotation on one end and threads along its mid-section. The high-speed compression adjuster shaft threads engage high-speed compression adjuster body threads within the high-speed rebound adjuster body 5103.

Secured to the high-speed rebound adjuster shaft 3503 on the end opposite the means for turning the adjuster shaft, is a high-speed rebound valve spring 903. The high-speed rebound valve spring 903 is pre-compressed more or less depending on the position of the high-speed rebound adjuster shaft 3503 threads in the high-speed rebound adjuster body 5103 threads. On the other side of the high-speed rebound valve spring 903, the high-speed rebound valve spring 903 presses a high-speed rebound exit valve 803 against a high-speed rebound adjuster plate 603 over the high-speed rebound adjuster chamber exit port 6375. The high-speed rebound adjuster chamber exit port 6375 is in the center of a high-speed rebound adjuster plate 603 formed on the end of the high-speed rebound adjuster body 5103 furthest from the means for turning the high-speed rebound adjuster shaft 3503.

The high-speed rebound adjuster body 5103 is internally threaded and the high-speed rebound adjuster shaft 3503 is externally threaded so that the high-speed rebound valve spring 903 pretension may be adjusted by the high-speed rebound adjuster shaft 3503. When the high-speed rebound adjuster shaft 3503 is rotated, the threads in the rebound adjuster body 5103 cause the preload on the high-speed rebound valve spring 903 to change.

A cavity is formed between the high-speed rebound adjuster body 5103 and the high-speed rebound adjuster plate 603 to create the rebound adjuster chamber 6036. The rebound adjuster chamber 6036 is bound on one side by the high-speed rebound adjuster body 5103 and the other side by the high-speed rebound adjuster plate 603.

In the high-speed rebound adjuster plate 603 is a centrally placed high-speed rebound adjuster chamber exit port 6375. Around the outside of the high-speed rebound adjuster plate 603 are one or more rebound plate return ports 6153. A rebound return valve 7113 seats inside the rebound adjuster chamber 6036, and on the high-speed rebound adjuster plate 603, blocking flow out of the rebound adjuster chamber 6036 through the one or more rebound plate return ports 6153. The rebound return valve 7113 may be easily pushed back from the high-speed rebound adjuster plate 603 to allow flow into the rebound adjuster chamber 6036. The high-speed rebound adjuster body 5103 has openings to allow fluids to transmit from the rebound adjuster chamber 6036 to adjuster block rebound entry port 1103 and low-speed rebound entry port.

Optionally, the high-speed rebound cavity 1123 is offset from the high-speed compression cavity 1121. Preferably, the compression exit port 1161 connects to an adjuster block compression entry port 1101. The axle clamp rebound port 1163 connects to an adjuster block rebound entry port 1103. An adjuster block 1170 includes a high-speed compression cavity 1121 formed on one end of an adjuster block 1170. The high-speed rebound cavity 1123 is a cavity formed on the other end of the adjuster block 1170. An adjuster volume 1151 is a cavity that both the high-speed compression cavity 1121 and the high-speed rebound cavity 1123 connect into. The adjuster block compression entry port 1101 connects to the high-speed compression cavity 1121.

An adjuster block rebound entry port 1103 connects to the high-speed rebound cavity 1123. A low-speed compression entry port 1102 connects the high-speed compression cavity 1121 to the low-speed compression cavity 1122. A low-speed rebound entry port 1104 connects the high-speed rebound cavity 1123 to the low-speed rebound cavity 1124. A low-speed return port 1141 connects to the adjuster volume 1151 and both the low-speed compression cavity 1122 and the low-speed rebound cavity 1124. The low-speed compression cavity 1122 receives a low speed compression adjuster shaft 3502. The low speed compression adjuster shaft 3502 meters and controls the flow of oil either by using a series of orifices, or by restricting the flow of oil via reducing the size of the orifice. The low-speed rebound cavity 1124 receives a low speed rebound adjuster shaft 3504. The low speed rebound adjuster shaft 3504 meters the flow of oil either by using a series of orifices, or by restricting the flow of oil via reducing the size of the orifice. A high-speed compression adjuster assembly 511 is mounted in the high-speed compression cavity 1121. A high-speed rebound adjuster assembly 513 is mounted in the high-speed rebound cavity 1123. Both the high-speed compression adjuster assembly 511 and high-speed rebound adjuster assembly 513 are similar in function and vary primarily in specification.

The high-speed compression adjuster assembly 511 has a high-speed compression adjuster shaft 3501 the passes coaxially through a high-speed compression adjuster body 5101. The high-speed compression adjuster shaft 3501, has a means for turning it about its longitudinal axis on one end and threads along its mid-section. The high-speed compression adjuster shaft threads engage high-speed compression adjuster body threads within the high-speed compression adjuster body 5101. Fixed to the high-speed compression adjuster shaft 3501, on the end opposite the means for turning the adjuster shaft, is a high-speed compression valve spring 901. The high-speed compression valve spring 901 is pre-compressed more or less depending on the position of the high-speed compression adjuster shaft 3501 threads in the high-speed compression adjuster body 5101 threads. On the other side of the high-speed compression valve spring 901, the high-speed compression valve spring 901 presses a high-speed compression exit valve 801 against an high-speed compression adjuster plate 601 over the high-speed compression adjuster chamber exit port 6175. The high-speed compression adjuster chamber exit port 6175 is in the center of an high-speed compression adjuster plate 601 formed on the end of the high-speed compression adjuster body 5101 furthest from the means for turning the high-speed compression adjuster shaft 3501. The high-speed compression adjuster body 5101 is internally threaded and the high-speed compression adjuster shaft 3501 is externally threaded so that the high-speed compression valve spring 903 pretension may be adjusted by the high-speed compression adjuster shaft 3501.

A cavity is formed between the high-speed compression adjuster body 5101 and the high-speed compression adjuster plate 601 to create the compression adjuster chamber 6016. The compression adjuster chamber 6016 is bound on one side by the high-speed compression adjuster body 5101 and the other side by the high-speed compression adjuster plate 601.

In the high-speed compression adjuster plate 601 is a centrally placed high-speed compression adjuster chamber exit port 6175 and around the outside of the high-speed compression adjuster plate 601 are one or more compression plate return ports 6151. A compression return valve 7111 sits inside the compression adjuster chamber 6016, and on the high-speed compression adjuster plate 601, blocking flow out of the compression adjuster chamber 6016 through the one or more compression plate return ports 6151.

The compression return valve 7111 may be easily pushed back from the high-speed compression adjuster plate 601 to allow flow into the compression adjuster chamber 6016. The high-speed compression adjuster body 5101 has openings to allow fluids to transmit from the compression adjuster chamber 6016 to adjuster block compression entry port 1101 and low-speed compression entry port 1102. The high-speed rebound adjuster assembly 513 is comprised of a high-speed rebound adjuster shaft 3503 passes coaxially through a high-speed rebound adjuster body 5103. The high-speed rebound adjuster shaft 3503 has a means for turning it about its longitudinal axis on one end and threads along its mid-section.

Fixed to the high-speed rebound adjuster shaft 3503, on the end opposite the means for turning the adjuster shaft, is a high-speed rebound valve spring 903. The high-speed rebound valve spring 903 is pre-compressed more or less depending on the position of the high-speed rebound adjuster shaft 3503 threads in the high-speed rebound adjuster body 5103 threads. On the other side of the high-speed rebound valve spring 903, the high-speed rebound valve spring 903 presses a high-speed rebound exit valve 803 against a high-speed rebound adjuster plate 603 over the high-speed rebound adjuster chamber exit port 6375. The high-speed rebound adjuster chamber exit port 6375 is in the center of a high-speed rebound adjuster plate 603 formed on the end of the high-speed rebound adjuster body 5103 furthest from the means for turning the high-speed rebound adjuster shaft 3503. The high-speed rebound adjuster body 5103 is internally threaded and the high-speed rebound adjuster shaft 3503 is externally threaded so that the high-speed rebound valve spring 903 pretension may be adjusted by the high-speed rebound adjuster shaft 3503. The high-speed rebound adjuster shaft 3503 is rotated, the threads in the rebound adjuster body 5103 cause the preload on the high-speed rebound valve spring 903 to change. A cavity is formed between the high-speed rebound adjuster body 5103 and the high-speed rebound adjuster plate 603 to create the rebound adjuster chamber 6036. The rebound adjuster chamber 6036 is bound on one side by the high-speed rebound adjuster body 5103 and the other side by the high-speed rebound adjuster plate 603. In the high-speed rebound adjuster plate 603 is a centrally placed high-speed rebound adjuster chamber exit port 6375 and around the outside of the high-speed rebound adjuster plate 603 are one or more rebound plate return ports 6153

A rebound return valve 7113 seats inside the rebound adjuster chamber 6036, and on the high-speed rebound adjuster plate 603, blocking flow out of the rebound adjuster chamber 6036 through the one or more rebound plate return ports 6153. The rebound return valve 7113 may be easily pushed back from the high-speed rebound adjuster plate 603 to allow flow into the rebound adjuster chamber 6036. The high-speed rebound adjuster body 5103 has openings to allow fluids to transmit from the rebound adjuster chamber 6036 to adjuster block rebound entry port 1103 and low-speed rebound entry port 1104. The adjuster block compression entry port 1101 connects to a compression adjuster chamber 6016 and an adjuster block rebound entry port 1103 connects to a rebound adjuster chamber 6036. The adjuster block compression entry port 1101 connects to a compression adjuster chamber 6016 and an adjuster block rebound entry port 1103 connects to a rebound adjuster chamber 6036.

Preferably, the adjuster block 1170 has a high-speed compression cavity 1121 formed as a cylindrical cavity on one end of an adjuster block 1170, and the high-speed rebound cavity 1123 is cylindrical cavity formed on another end of the adjuster block 1170. An adjuster volume 1151 is formed as a cavity that both the high-speed compression cavity 1121 and the high-speed rebound cavity 1123 connect into. An adjuster block compression entry port 1101 connects to the high-speed compression cavity 1121. An adjuster block rebound entry port 1103 connects to the high-speed rebound cavity 1123. A low-speed compression entry port 1102 connects the high-speed compression cavity 1121 to the low-speed compression cavity 1122. A low-speed rebound entry port 1104 connects the high-speed rebound cavity 1123 to the low-speed rebound cavity 1124. A low-speed return port 1141 connects to the adjuster volume 1151 and both the low-speed compression cavity 1122 and the low-speed rebound cavity 1124. The low-speed compression cavity 1122 receives a low speed compression adjuster shaft 3502. The low speed compression adjuster shaft 3502 meters or controls the flow of oil either by using a series of orifices, or by restricting the flow of oil via reducing the size of the orifice. The low-speed rebound cavity 1124 receives a low speed rebound adjuster shaft 3504. The low speed rebound adjuster shaft 3504 meters or controls the flow of oil either by using a series of orifices, or by restricting the flow of oil via reducing the size of the orifice. A high-speed compression adjuster assembly 511 is placed in the high-speed compression cavity 1121. A high-speed rebound adjuster assembly 513 is placed in the high-speed rebound cavity 1123. Both the high-speed compression adjuster assembly 511 and high-speed rebound adjuster assembly 513 are similar in function and vary primarily in specification. The high-speed compression adjuster assembly 511 has a high-speed compression adjuster shaft 3501 that passes coaxially through a high-speed compression adjuster body 5101. The high-speed compression adjuster shaft 3501 has a means for turning it about its longitudinal axis on one end and threads along its mid-section. Fixed to the high-speed compression adjuster shaft 3501, on the end opposite the means for turning the adjuster shaft, is a high-speed compression valve spring 901. The high-speed compression valve spring 901 is pre-compressed more or less depending on the position of the high-speed compression adjuster shaft 3501 threads in the high-speed compression adjuster body 5101 threads.

On the other side of the high-speed compression valve spring 901, the high-speed compression valve spring 901 presses a high-speed compression exit valve 801 against an high-speed compression adjuster plate 601 over the high-speed compression adjuster chamber exit port 6175. The high-speed compression adjuster chamber exit port 6175 is in the center of an high-speed compression adjuster plate 601 formed on the end of the high-speed compression adjuster body 5101 furthest from the means for turning the high-speed compression adjuster shaft 3501. The high-speed compression adjuster body 5101 is internally threaded and the high-speed compression adjuster shaft 3501 is externally threaded so that the high-speed compression valve spring 903 pretension may be adjusted by the high-speed compression adjuster shaft 3501.

A cavity is formed between the high-speed compression adjuster body 5101 and the high-speed compression adjuster plate 601 to create the compression adjuster chamber 6016. The compression adjuster chamber 6016 is bound on one side by the high-speed compression adjuster body 5101 and the other side by the high-speed compression adjuster plate 601. The high-speed compression adjuster plate 601 receives a centrally placed high-speed compression adjuster chamber exit port 6175. Around the outside of the high-speed compression adjuster plate 601 are one or more compression plate return ports 6151.

A compression return valve 7111 sits inside the compression adjuster chamber 6016, and on the high-speed compression adjuster plate 601, blocking flow out of the compression adjuster chamber 6016 through the one or more compression plate return ports 6151. The compression return valve 7111 may be easily pushed back from the high-speed compression adjuster plate 601 to allow flow into the compression adjuster chamber 6016.

The high-speed compression adjuster body 5101 has openings to allow fluids to transmit from the compression adjuster chamber 6016 to adjuster block compression entry port 1101 and low-speed compression entry port 1102. The high-speed rebound adjuster assembly 513 has a high-speed rebound adjuster shaft 3503 that passes coaxially through a high-speed rebound adjuster body 5103. The high-speed rebound adjuster shaft 3503, has a means for turning it about its longitudinal axis on one end and threads along its mid-section.

Fixed to the high-speed rebound adjuster shaft 3503, on the end opposite the means for turning the adjuster shaft, is a high-speed rebound valve spring 903, the high-speed rebound valve spring 903 is pre-compressed more or less depending on the position of the high-speed rebound adjuster shaft 3503 threads in the high-speed rebound adjuster body 5103 threads. On the other side of the high-speed rebound valve spring 903, the high-speed rebound valve spring 903 presses a high-speed rebound exit valve 803 against a high-speed rebound adjuster plate 603 over the high-speed rebound adjuster chamber exit port 6375. The high-speed rebound adjuster chamber exit port 6375 is in the center of a high-speed rebound adjuster plate 603 formed on the end of the high-speed rebound adjuster body 5103 furthest from the means for turning the high-speed rebound adjuster shaft 3503. The high-speed rebound adjuster body 5103 is internally threaded and the high-speed rebound adjuster shaft 3503 is externally threaded so that the high-speed rebound valve spring 903 pretension may be adjusted by the high-speed rebound adjuster shaft 3503. When the high-speed rebound adjuster shaft 3503 is rotated, the threads in the rebound adjuster body 5103 cause the preload on the high-speed rebound valve spring 903 to change.

A cavity is formed between the high-speed rebound adjuster body 5103 and the high-speed rebound adjuster plate 603 to create the rebound adjuster chamber 6036. The rebound adjuster chamber 6036 is bound on one side by the high-speed rebound adjuster body 5103 and the other side by the high-speed rebound adjuster plate 603. In the high-speed rebound adjuster plate 603 is a centrally placed high-speed rebound adjuster chamber exit port 6375 and around the outside of the high-speed rebound adjuster plate 603 are one or more rebound plate return ports 6153. A rebound return valve 7113 sits inside the rebound adjuster chamber 6036, and on the high-speed rebound adjuster plate 603, blocking flow out of the rebound adjuster chamber 6036 through the one or more rebound plate return ports 6153. The rebound return valve 7113 may be easily pushed back from the high-speed rebound adjuster plate 603 to allow flow into the rebound adjuster chamber 6036. The high-speed rebound adjuster body 5103 has openings to allow fluids to transmit from the rebound adjuster chamber 6036 to adjuster block rebound entry port 1103 and low-speed rebound entry port 1104

An adjuster block high-speed rebound cavity 1123 is offset from the high-speed compression cavity 1121. An adjuster block compression entry port 1101 connects to a compression adjuster chamber 6016. An adjuster block rebound entry port 1103 connects to a rebound adjuster chamber 6036. A low speed compression adjuster shaft 3502 connects to the compression adjuster chamber 6016, and the low speed compression adjuster shaft 3502 meters the flow of oil either by using a series of orifices, or by restricting the flow of oil via reducing the size of the orifice. A low speed rebound adjuster shaft 3504 connects to the rebound adjuster chamber 6036, the low speed rebound adjuster shaft 3504 meters the flow of oil either by using a series of orifices, or by restricting the flow of oil via reducing the size of the orifice, flow from both the low speed compression adjuster shaft 3502 and the low speed rebound adjuster shaft 3504 flows into an adjuster volume 1151. A high-speed compression adjuster shaft 3501 passes through the compression adjuster chamber 6016. The high-speed compression adjuster shaft 3501, has a means for turning it about its longitudinal axis on one end.

Fixed to the high-speed compression adjuster shaft 3501, on the end opposite the means for turning the adjuster shaft, is a high-speed compression valve spring 901. On the other side of the high-speed compression valve spring 901, the high-speed compression valve spring 901 presses a high-speed compression exit valve 801 over the high-speed compression adjuster chamber exit port 6175. The high-speed compression adjuster chamber exit port 6175 is between the adjuster volume 1151 and the compression adjuster chamber 6016. The high-speed compression adjuster chamber exit port 6175 exits the compression adjuster chamber 6016 furthest from the means for turning the high-speed compression adjuster shaft 3501. Between the adjuster volume 1151 and the compression adjuster chamber 6016 are also one or more compression plate return ports 6151. A compression return valve 7111 sits inside the compression adjuster chamber 6016, blocking flow out of the compression adjuster chamber 6016 through the one or more compression plate return ports 6151. The compression return valve 7111 may be easily pushed back from the one or more compression plate return ports 6151 to allow flow into the compression adjuster chamber 6016 from the adjuster volume 1151. A high-speed rebound adjuster shaft 3503 passes through the rebound adjuster chamber 6036. The high-speed rebound adjuster shaft 3503, has a means for turning it about its longitudinal axis on one end and threads along its mid-section. Fixed to the high-speed rebound adjuster shaft 3503, on the end opposite the means for turning the adjuster shaft, is a high-speed rebound valve spring 903. On the other side of the high-speed rebound valve spring 903, the high-speed rebound valve spring 903 presses a high-speed rebound exit valve 803 over the high-speed rebound adjuster chamber exit port 6375. The high-speed rebound adjuster chamber exit port 6375 is between the adjuster volume 1151 and the rebound adjuster chamber 6036, the high-speed rebound adjuster chamber exit port 6375 exits the rebound adjuster chamber 6036 furthest from the means for turning the high-speed rebound adjuster shaft 3503. In the rebound adjuster chamber 6036 are one or more rebound plate return ports 6153. A rebound return valve 7113 sits inside the rebound adjuster chamber 6036, blocking flow out of the rebound adjuster chamber 6036 through the one or more rebound plate return ports 6153. The rebound return valve 7113 may be easily pushed back from the one or more rebound plate return ports 6153 to allow flow into the rebound adjuster chamber 6036 from the adjuster volume 1151.

Figure 1:
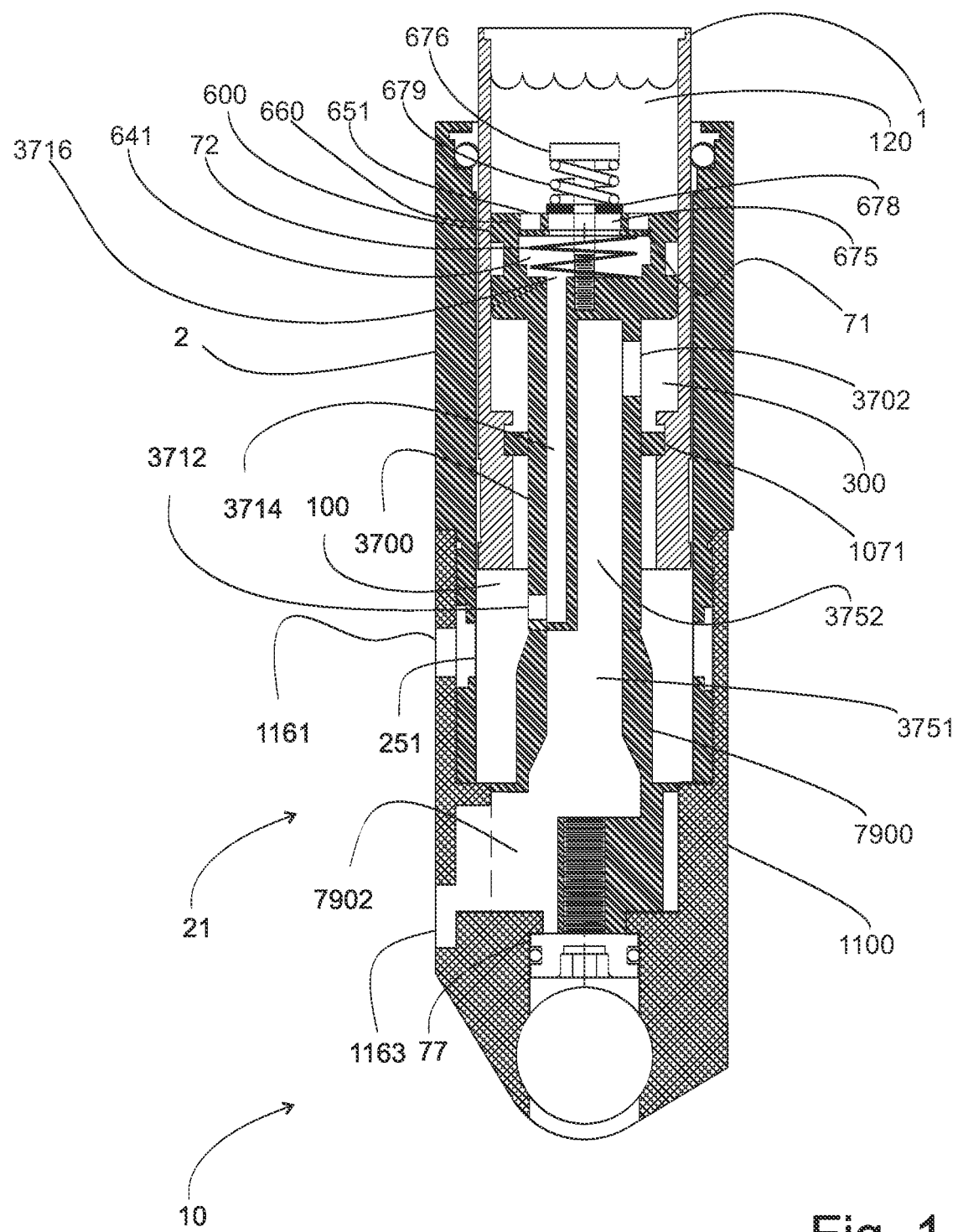
FIG. 1 is a cross-section diagram of the suspension body.

The following call out list of elements can be a useful guide in referencing the element numbers of the drawings.
  01 inner tube
  02 outer tube
  03 dampener rod assembly
  10 suspension unit
  21 piston assembly
  31 brake caliper mount bracket
  38 rebound valve, spring tree
  67 brake bracket bolts
  71 dampener rod return valve
  72 dampener rod return spring
  77 bottom out cone retainer bolt
  78 bottom out cone retainer bolt seal
  100 compression chamber
  120 inner tube rezy
  251 outer tube port
  300 rebound chamber
  510 high-speed adjuster assembly
  511 high-speed compression adjuster
  513 high-speed rebound adjuster
  600 dampener rod piston
  601 high-speed compression adjuster plate
  603 high-speed rebound adjuster plate
  641 dampener rod piston chamber
  651 dampener rod piston ports
  660 dampener rod piston plate
  675 over pressure port
  676 over pressure bolt
  678 over pressure valve
  679 over pressure spring
  700 dampener rod piston seal
  801 high-speed compression valve
  803 high-speed rebound valve
  901 high-speed compression valve spring
  903 high-speed rebound valve spring
  1071 dampener rod seal
  1100 axle clamp
  1101 adjuster block compression entry port
  1102 low-speed compression entry port
  1102 low-speed compression entry port
  1103 adjuster block rebound entry port
  1104 low-speed rebound entry port
  1104 low-speed rebound entry port
  1121 high-speed compression cavity
  1122 low-speed compression cavity
  1123 high-speed rebound cavity
  1124 low-speed rebound cavity
  1141 low-speed return port
  1151 adjuster volume
  1161 compression exit port
  1163 axle clamp rebound port
  1170 adjuster block
  1177 adjuster assembly
  3501 high-speed compression adjuster shaft
  3502 low-speed compression adjuster shaft
  3503 high-speed rebound adjuster shaft
  3504 low-speed rebound adjuster shaft
  3542 low-speed compression transfer
  3544 low-speed rebound transfer
  3700 dampener rod
  3701 dampener rod threads
  3702 dampener rod inlet port
  3712 dampener rod transfer outlet
  3714 dampener rod transfer chamber
  3716 dampener rod transfer inlet
  3751 dampener rod chamber
  3752 dampener rod rebound passage
  3761 dampener rod threads
  4001 high-speed compression spring cup
  4003 high-speed rebound spring cup
  5101 high-speed compression adjuster body
  5103 high-speed rebound adjuster body
  5801 high-speed compression adjuster spring 5802 low-speed compression adjuster spring
5803 high-speed rebound adjuster spring
5804 low-speed rebound adjuster spring
5901 high-speed compression adjuster ball
5902 low-speed compression adjuster ball
5903 high-speed rebound adjuster ball
5904 low-speed rebound adjuster ball
6001 high-speed compression spring retainer
6003 high-speed rebound spring retainer
6014 compression adjuster chamber entrance port
6015 compression adjuster chamber exit port
6016 compression adjuster chamber
6017 adjuster chamber
6034 rebound adjuster chamber entrance port
6035 rebound adjuster chamber exit port
6036 rebound adjuster chamber
6101 high-speed compression retainer
6102 low-speed compression retainer
6103 high-speed rebound retainer
6104 low-speed rebound retainer
6151 compression plate return port
6153 rebound plate return port
6175 high-speed compression adjuster chamber exit port
6375 high-speed rebound adjuster chamber exit port
7111 compression return valve
7113 rebound return valve
7211 high-speed compression return spring
7213 high-speed rebound return spring
7900 bottom out cone
7902 bottom out cone entry port
7903 bottom out cone support
8301 high-speed compression spring circlip
8303 high-speed rebound spring circlip
9401 high-speed compression adjuster seal
9402 low-speed compression adjuster seal
9403 high-speed rebound adjuster seal
9404 low-speed rebound adjuster seal
9911 high-speed compression adjuster housing seal
9913 high-speed rebound adjuster housing seal

DETAILED DESCRIPTION OF THE PREFERRED EMBODIMENT

As seen in FIG. 1, a suspension unit 10 includes suspension body formed as a piston assembly 21. The piston assembly 21 preferably has three concentric cylindrical bodies. The outermost concentric cylindrical body is the outer tube which substantially encapsulates the inner tube 1 and the dampener rod assembly3 having a dampener rod 3700 in a telescopic configuration. The outer tube 2 is concentric to the inner tube 1. The dampener rod assembly having the dampener rod 3700 is substantially encapsulated within and concentric to the inner tube 1. At one end of the dampener rod, the dampener rod piston 600 seals against the inside of the inner tube 1. The dampener rod piston 600 divides the internal volume of the inner tube 1 into the inner tube rezy 120, and the rebound chamber 300. A dampener rod piston volume 641 is formed within the dampener rod piston 600. The dampener rod 3700 is rigidly connected to the outer tube 2, and the inner tube 1 is sandwiched between the dampener rod 3700 and the outer tube 2. The inner tube 1 slides relative to the dampener rod 3700 and the outer tube 2. The outer tube 2 has a larger diameter than the inner tube 1, and the inner tube 1 has a larger diameter than the dampener rod 3700. A distal end of the inner tube 1 extends out of and away from the outer tube 2.

The dampener rod return spring 72 biases the dampener rod return valve 71 against the dampener rod piston ports 651 to form a check valve allowing flow from the inner tube rezy 120 but blocking flow from the dampener rod piston volume 641 to the inner tube rezy 120. The dampener rod return spring 72 can be a helical spring in compression and mounted around the overpressure bolt 676.

An over pressure valve 678 abuts and seats on the inner tube rezy 120 side of the dampener rod piston 600. The over pressure valve 678 blocks an over pressure port 675. Preferably, the dampener rod return spring 72 is more pliable than the overpressure spring 679 such that the overpressure port 675 has two modes of operation, namely a normal mode of operation where the dampener rod return spring 72 is reciprocating, and an overpressure mode where the overpressure spring 679 is overpressured to an open position.

The over pressure valve 678 may include a seal formed as one or more circular washers which either bend or slide back to allow pressurized oil to flow out of the dampener rod piston volume 641 and into the inner tube rezy 120. An overpressure spring 679 can control the over pressure valve 678. The spring pretension may be adjusted by an over pressure bolt 676. Inside the dampener rod 3700 is a dampener rod transfer chamber 3714 which allows fluid to flow from the dampener rod transfer inlet 3716 to a dampener rod transfer outlet 3712. The dampener rod transfer outlet 3712 connects to the compression chamber 100.

The end of the outer tube 2 opposite the inner tube rezy 120 is capped by an axle clamp 1100. The axle clamp 1100 closes off the outer tube 2 and forms a compression chamber 100, between the dampener rod seal 1071 and the axle clamp 1100. The axle clamp 1100 provides a means to mount an axle and the brake caliper mount bracket 31 as well as several ports for transmitting oil flow. One of these ports is the outer tube port 251 which connects the adjuster block assembly 1170 via the compression exit port 1161.

The other axle clamp 1100 port is the axle clamp rebound port 1163. The axle clamp rebound port 1163 connects to the bottom out cone entry port 7902. The bottom out cone entry port 7902 is an opening in the bottom out cone 7900. The bottom out cone 7900 is connected directly to the dampener rod 3700 at the end opposite the dampener rod piston 600. A cavity inside the bottom out cone 7900 and the dampener rod 3700 is the dampener rod chamber 3751 and freely connects the bottom out cone entry port 7902 to the dampener rod rebound passage 3752.

The dampener rod 3700 has a port, namely the dampener rod inlet 3702, which allows fluid to transfer from the rebound chamber 300 to the dampener rod rebound passage 3752. Thus, fluid may pass directly from the rebound chamber 300 to the axle clamp rebound port 1163. The rebound port 1163 may be connected to the compression exit port 1161 with any number of means may be provided for metering the flow of oil between these ports which in essence allows control of the flow of fluid between the rebound chamber 300 and the compression chamber 100.

Figure 2:
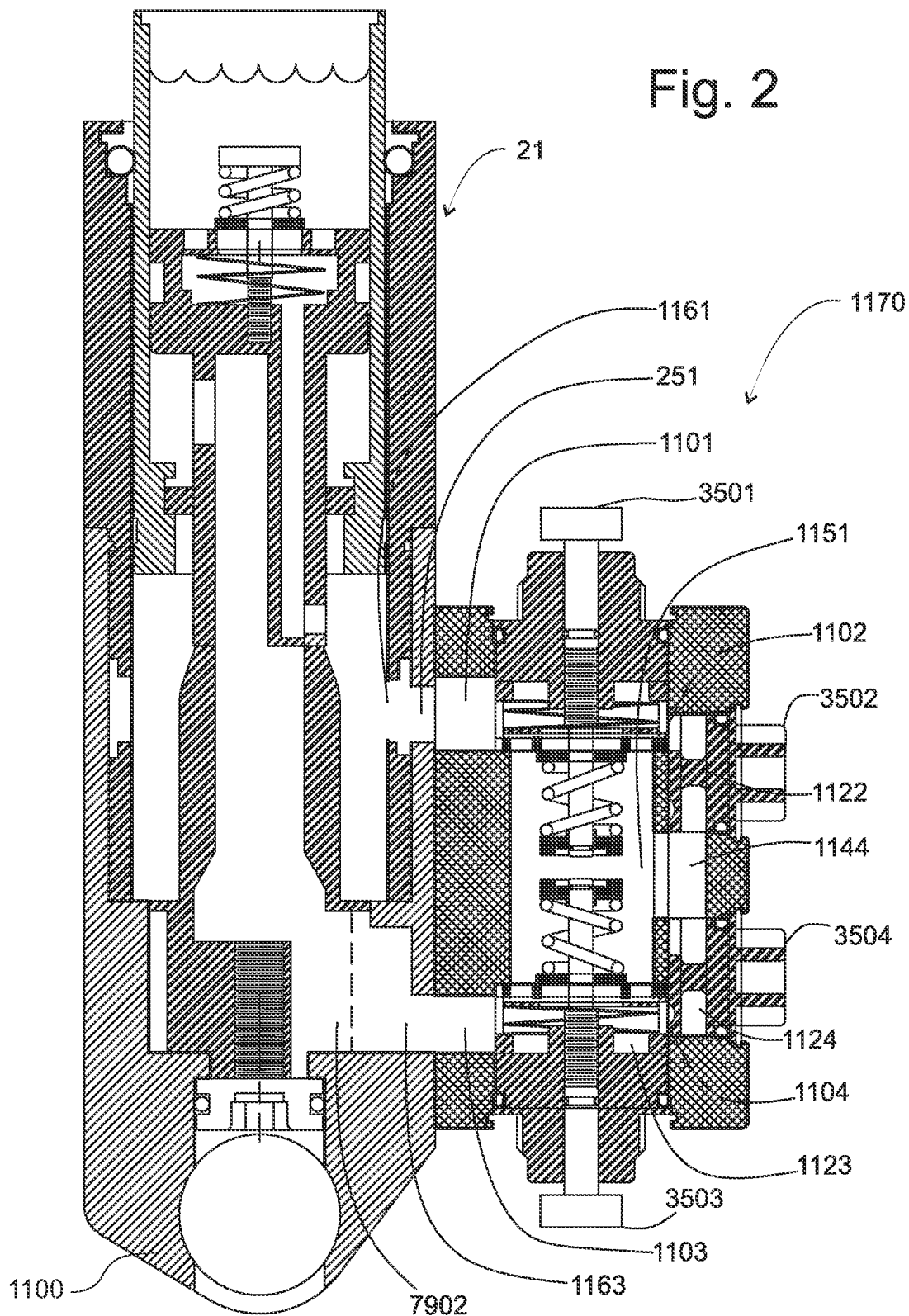
FIG. 2 is a cross-section diagram of the body with adjuster.
Figure 3:
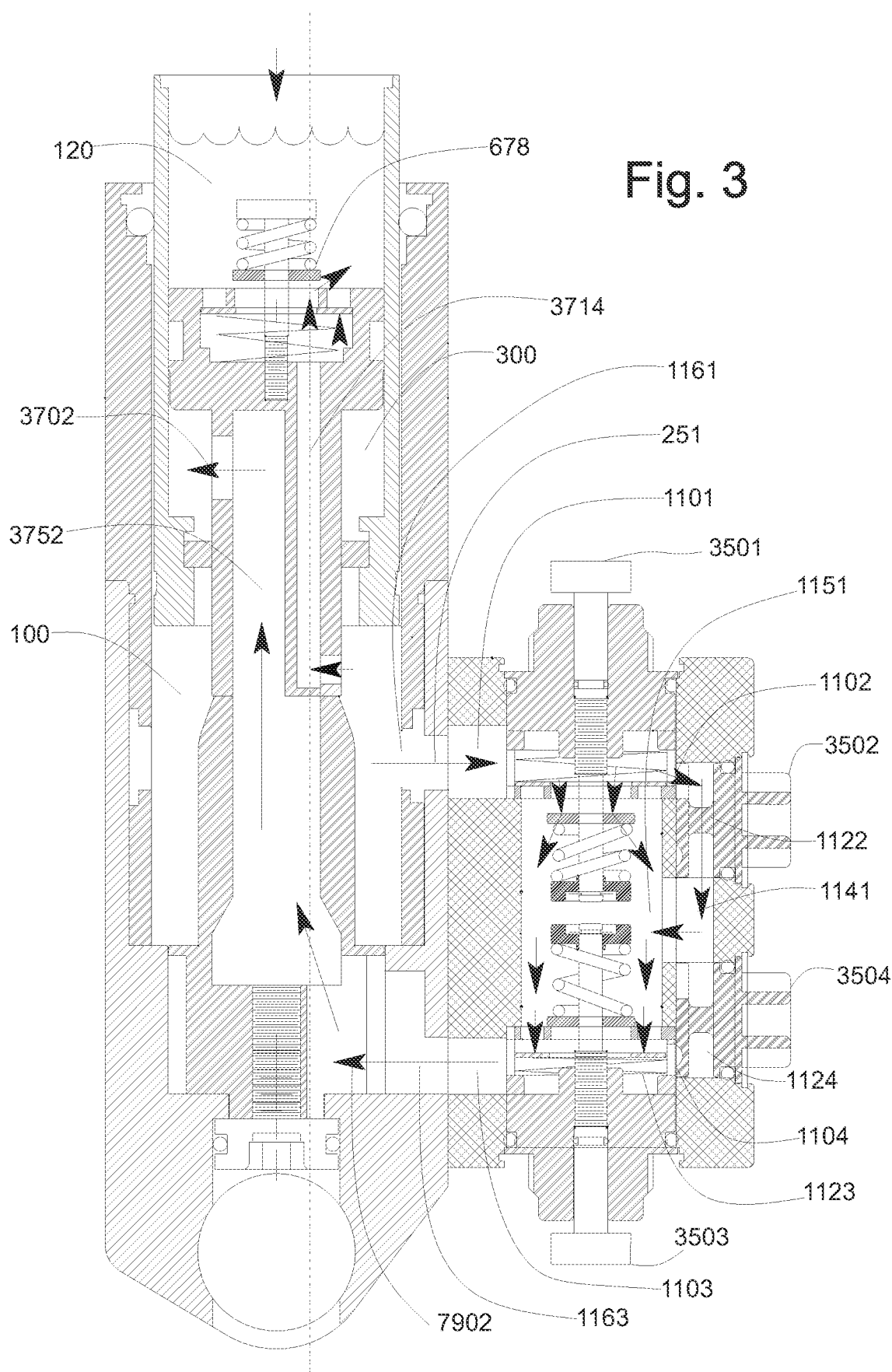
FIG. 3 is a cross-section diagram of the compression flow in the body with adjuster.
Figure 4:
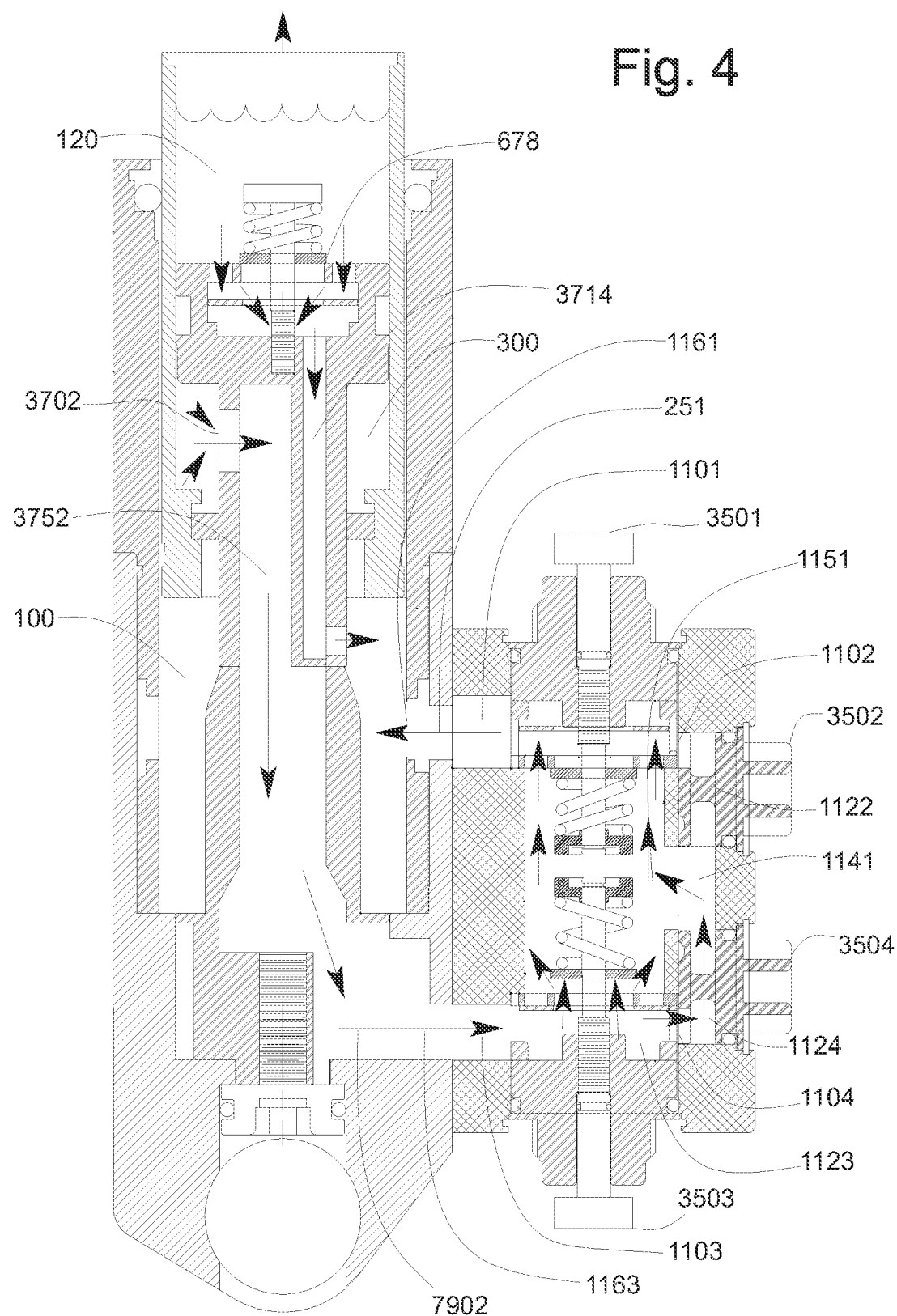
FIG. 4 is a cross-section diagram of the rebound flow in the body with adjuster.
Figure 5:
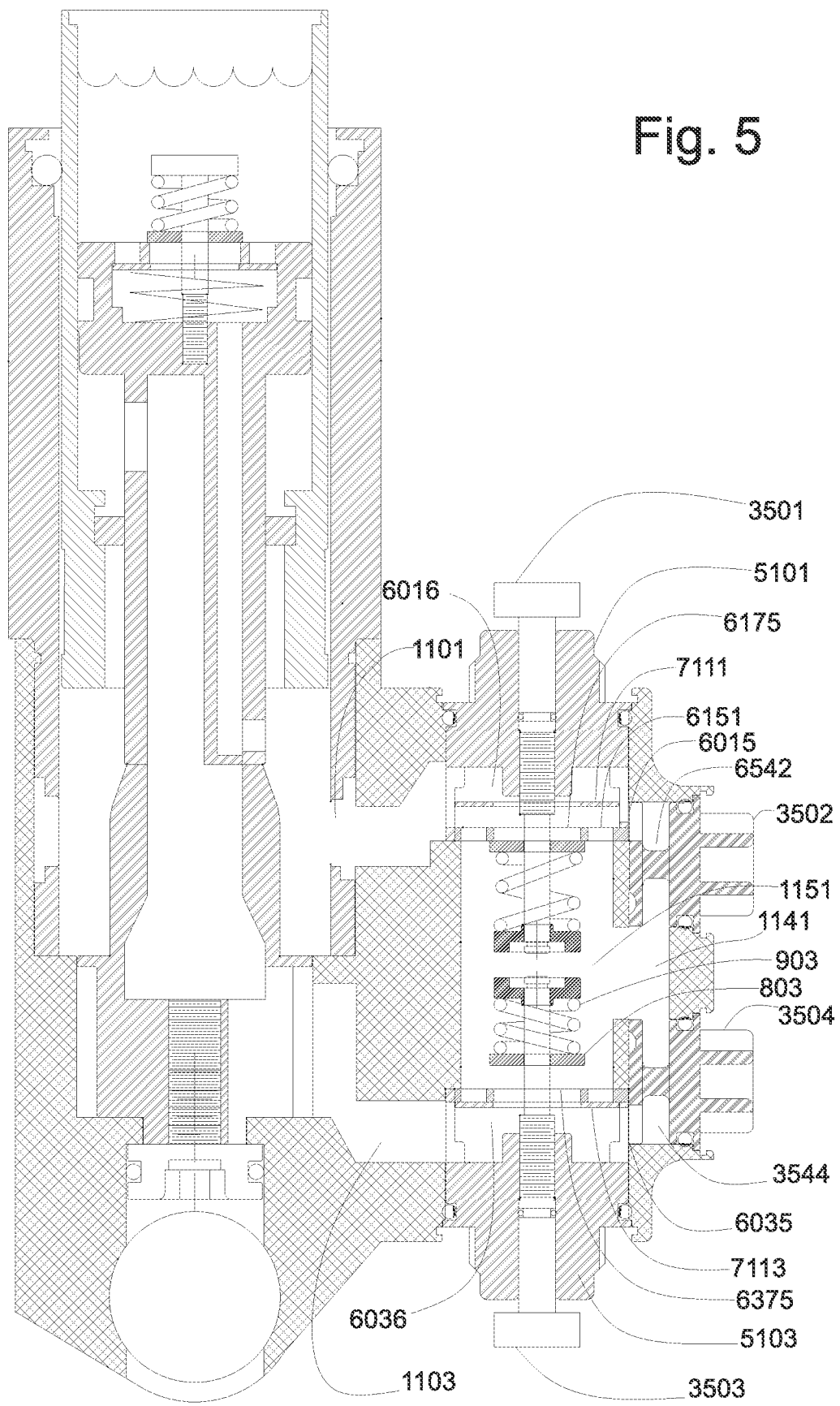
FIG. 5 is a cross-section diagram of the body with adjuster.

As seen in FIGS. 2-5, an adjuster having an adjuster block 1170 is one such means for controlling a flow of oil between the rebound chamber 300 and the compression chamber 100. The adjuster having an adjuster block 1170 is connected to the body formed as a piston assembly 21 where the adjuster block 1170 is attached to the piston assembly 21. FIG. 2 shows a cross-section diagram of the body with adjuster when the piston assembly is in a neutral position. FIG. 3 is a cross-section diagram of the compression flow in the piston assembly 21 with adjuster block which occurs when a motorcycle shock is being compressed, such as when a motorcycle wheel runs over a bump in the road. FIG. 4 is a cross-section diagram of the rebound flow in the body with adjuster which occurs when the motorcycle shock is being extended, such as after a motorcycle wheel runs over a bump in the road. FIG. 5 is a cross-section diagram of the body with adjuster describing additional detail. Generally, the adjuster has four independent mechanical settings, namely a high-speed, or high-frequency vibration setting and a low-speed, or low-frequency vibration setting. The adjuster has a high-frequency rebound setting, a high-frequency compression setting, a low-frequency rebound setting and a low-frequency compression setting.

The compression exit port 1161 may be connected and possibly integral with an adjuster block compression entry port 1101 such a port connects to the high-speed compression adjuster chamber 6016. The high-speed compression adjuster chamber 6016 has several exit and entrance ports the first such port is the high-speed compression adjuster exit port 6015 which connects to the low speed compression adjuster shaft 3502. The low speed compression adjuster shaft 3502 can meter the flow of oil either by using a series of orifices, or by restricting the flow of oil via reducing the size of the orifice. The low speed compression adjuster shaft 3502 connects to the adjuster volume 1151 via a low speed return port 1141. The adjuster volume 1151 is preferably a cylindrical cavity formed in the adjuster block 1170 and coaxially aligned to the high-speed compression adjuster shaft 3501 and the high-speed rebound adjuster shaft 3503, where the high-speed compression adjuster shaft 3501 and the high-speed rebound adjuster shaft 3503 are coaxial and parallel to each other.

Flow from the high-speed compression adjuster chamber 6016 can exit the high-speed compression piston exit port 6175. To do so, the pressure in the high-speed compression adjuster chamber 6016 must be sufficient to push the high-speed compression valve 801 open past the force of the high-speed compression valve spring 901. The high-speed compression valve spring 901 has one end against the high-speed compression valve 801 and one end against the high-speed compression spring cup 4001.

The spring pretension may be adjusted by the high-speed compression adjuster shaft 3501 which can have an external knob head for tool access and shaped like a machine bolt with a sealed internal end. The low speed compression adjuster shaft 3501 is a cylindrical body that passes through the center of the high-speed compression adjuster body 5101, high-speed compression valve 801, the high-speed compression valve spring 901, and the high-speed compression spring cup 4001. The high-speed compression spring cup 4001 is fixed to the low speed compression adjuster shaft 3501 on the one end, and retained by threads or other mechanisms on the section that pass through the high-speed compression adjuster body 5101. When the low speed compression adjuster shaft 3501 is rotated, the threads in the high-speed compression adjuster body 5101 cause the preload on the high-speed compression valve spring 901 to change. Thus, the low speed compression adjuster shaft 3501 allows an external mechanism or manual control to control the valve operation of the suspension unit with independent controls for high-speed rebound and compression. For example, a user can select a soft rebound with a hard compression or a soft compression with a hard rebound by turning the respective adjuster shafts either manually or by servomotor.

Fluid may flow from the adjuster volume 1151 back to the high-speed compression adjuster chamber 6016. The cylindrical disk washer high-speed compression return valve 7111 sits on the high-speed compression piston 601, effectively blocking flow from the high-speed compression adjuster chamber 6016 to the adjuster volume 1151, but is easily pushed back and freely allows flow from the adjuster volume 1151 to the high-speed compression adjuster chamber 6016. The high-speed compression return valve 7111 is biased by a high-speed compression return valve spring 7211 and the high-speed rebound return valve 7113 is biased by a high-speed rebound return valve spring 7213.

The axle clamp rebound port 1163 may be connected and possibly integral with an adjuster block rebound entry port 1103 such a port connects to the high-speed rebound adjuster chamber 6036. The high-speed rebound adjuster chamber 6036 has several exit and entrance ports. The first such port is the high-speed rebound adjuster exit port 6035 which connects to the low speed rebound adjuster shaft 3504. The low speed rebound adjuster shaft 3504 can meter the flow of oil either by using a series of orifices, or by restricting the flow of oil via reducing the size of the orifice. The low speed rebound adjuster shaft 3504 connects to the adjuster volume 1151 via a low speed return port 1141. Flow from the high-speed rebound adjuster chamber 6036 can exit the high-speed rebound piston exit port 6375. To do so the pressure in the high-speed rebound adjuster chamber 6036 must be sufficient to push the high-speed rebound valve 803 open past the force of the high-speed rebound valve spring 903. The high-speed rebound valve spring 903 has one end against the high-speed rebound valve 803 and one end against the high-speed rebound spring cup 4003.

The spring pretension may be adjusted by the high-speed rebound adjuster shaft 3503. The high-speed rebound adjuster shaft 3503 is a cylindrical body that passes through the center of the high-speed rebound adjuster body 5103, high-speed rebound valve 803, the high-speed rebound valve spring 903, and the high-speed rebound spring cup 4003. The high-speed rebound spring cup 4003 is fixed to the high-speed rebound adjuster shaft 3503 on the one end, and retained by threads or other mechanism on the section that passes through the high-speed rebound adjuster body 5103. When the high-speed rebound adjuster shaft 3503 is rotated, the threads in the high-speed rebound adjuster body 5103 cause the preload on the high-speed rebound valve spring 903 to change. Thus, there can be a manual or an external mechanism to control the rebound valve of the suspension unit.

Fluid may flow from the adjuster volume 1151 back to the high-speed rebound adjuster chamber 6036. The cylindrical disk washer high-speed rebound return valve 7113 sits on the high-speed rebound piston 603, effectively blocking flow from the high-speed rebound adjuster chamber 6036 to the adjuster volume 1151, but is easily pushed back and freely allows flow from the adjuster volume 1151 to the high-speed rebound adjuster chamber 6036.

The main body operates in a compression stroke. On the compression stroke, FIG. 101 the inner tube 01 is pushed towards the outer tube 02. This causes the volume of the compression chamber 100 to be reduced. Naturally pressure increases in the compression chamber 100. Oil is then forced out of the compression chamber 100 out through the outer tube ports 251, and dampener rod transfer outlet 3712.

Oil that moves into the dampener rod transfer outlet 3712 is blocked, since the dampener rod return valve 71 blocks the dampener rod piston ports 651 preventing flow through the dampener rod transfer chamber 3714. The oil that flows out of the compression chamber 100 through the outer tube ports 251 and compression exit port 1161 enters the adjuster block 1170 at the adjuster block compression entry port 1101.

A variety of methods such as combinations of electric valves or mechanically operated valves can meter the flow through the adjuster block 1170. After oil is adjusted in the adjuster block 1170 it exits the adjuster block 1170 at an adjuster block rebound entry port 1103 and enters at the axle clamp rebound port 1163.

From there the oil flows to the bottom out cone entry port 7902 and enters the dampener rod chamber 3751 flowing on through the dampener rod rebound passage 3752 and out through the dampener rod inlet 3702 and back into the rebound chamber 300. The pressure in the rebound chamber 300 is reduced when the inner tube 01 is pushed towards the outer tube 02 the rebound chamber 300 expands.

A mechanical system for the adjuster block 1170 operates on oil. In compression, the adjuster block has a flow of oil within it. On compression oil is driven into the adjuster block compression entry port 1101 and then passes through the high speed compression adjuster exit port 6014 and into the high speed compression adjuster chamber 6016. The high speed compression return valve 7111 prevents flow from the high speed compression adjuster chamber 6016 through the high speed compression piston 601 to the adjuster volume 1151.

From the high speed compression adjuster chamber 6016, oil may flow one of two ways, either though the high speed compression adjuster exit port 6015 or through the high speed compression piston 601. When oil flows though the high speed compression adjuster exit port 6015 and into the low speed compression adjuster shaft 3502, the low speed low speed compression adjuster shaft 3502 can meter the flow of oil either by using a series of orifice s, or by restricting the flow of oil via reducing the size of the orifice. Then oil flows through the high speed compression piston 601, the increase in pressure in the high speed compression adjuster chamber 6016 pushes open a high speed compression valve 801. The high speed compression valve 801 may be made up of one or more washers which either bend or slide back to allow pressurized oil to flow out of the high speed compression adjuster chamber 6016 and into the adjuster volume 1151. The high speed compression valve 801 can be controlled by a high speed compression valve spring 901. The spring pretension may be adjusted by a high speed rebound adjuster shaft 3501.

The main body operates with a rebound stroke. On the rebound stroke, as seen in FIG. 4 the inner tube 01 pulls away from the outer tube 02 and towards the dampener rod piston 600. The rebound chamber 300 is a volume inside the inner tube 01, between the dampener rod piston 600 and inner tube seal 1071. The dampener rod 3700 is located coaxially inside the inner tube 01. The pressure in the rebound chamber 300 increases because as the inner tube 01 is pulled away from the outer tube 02 and towards the dampener rod piston 600 the rebound chamber 300 shrinks. The pressurized fluid in rebound chamber 300 flows through the dampener rod inlet 3702 and into the dampener rod rebound chamber 3752, and on through the dampener rod chamber 3751. From there the fluid flows out the bottom out cone entry port 7902 and out the axle clamp rebound port 1163 to the adjuster block rebound entry port 1103 into the adjuster block 1170.

The adjuster block also operates with a rebound stroke. On rebound, oil is driven into the adjuster block rebound entry port 1103 and then passes through the high speed rebound adjuster entrance port 6034 and into the high speed rebound adjuster chamber 6036. The high speed rebound return valve 7113 prevents flow from the high speed rebound adjuster chamber 6036 passing through the high speed rebound piston 603 to the adjuster volume 1151.

From the high speed rebound adjuster chamber 6036, oil may flow one of two ways, either though the high speed rebound adjuster exit port 6035 or through the high speed rebound piston 603. When oil passes through the high speed rebound adjuster exit port 6035 and into the low speed rebound adjuster shaft 3504, the low speed low speed rebound adjuster shaft 3504 can meter the flow of oil either by using a series of orifices, or by restricting the flow of oil via reducing the size of the orifice. When the oil passes through the high speed rebound piston 603, an increase in pressure in the high speed rebound adjuster chamber 6036 pushes open a high speed rebound valve 803. The high speed rebound valve 803 may be made up of one or more washers which either bend or slide back to allow pressurized oil to flow out of the high speed rebound adjuster chamber 6036 and into the adjuster volume 1151.

A high speed rebound valve spring 903 can control a high speed rebound valve 803. A high speed rebound adjuster shaft 3503 adjusts the spring pretension. The pressurized fluid travels after being metered by the adjuster mechanisms it ends up in the adjuster volume 1151. From the adjuster volume the fluid can pass through the high speed compression piston 601 by pushing back the high speed compression return valve 7111 and enters the high speed compression adjuster chamber 6016. From there it can pass directly through the high speed compression adjuster entrance port 6014 which leads to the adjuster block compression entry port 1101.

Figure 6:
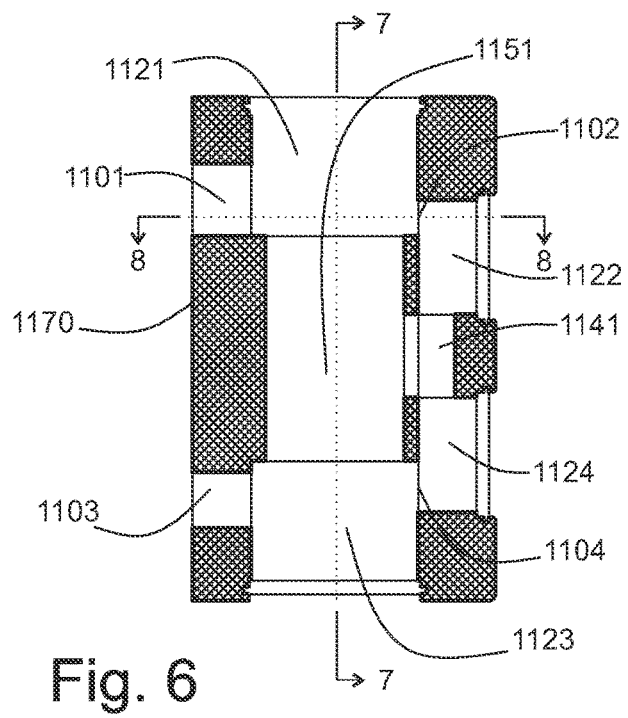
FIG. 6 is a cross-section diagram of the adjuster.
Figure 7:
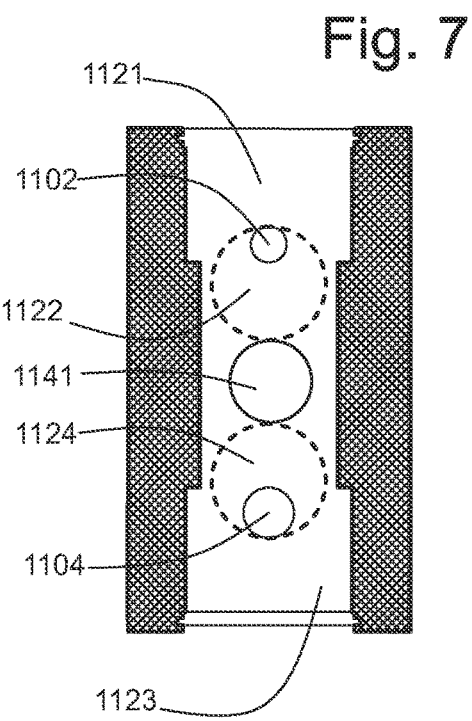
FIG. 7 is a cross-section diagram of the adjuster.
Figure 8:
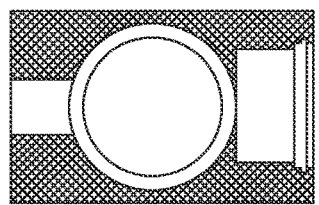
FIG. 8 is a cross-section diagram of the adjuster.

As seen in FIGS. 6-8, various cross-sections of the adjuster provide a more detailed diagram for manufacturing a preferred embodiment of the adjuster. FIG. 6 is a side view cross-section diagram of the adjuster. FIG. 7 is a front cross-section diagram of the adjuster. FIG. 8 is a top cross-section diagram of the adjuster.

Figure 9:
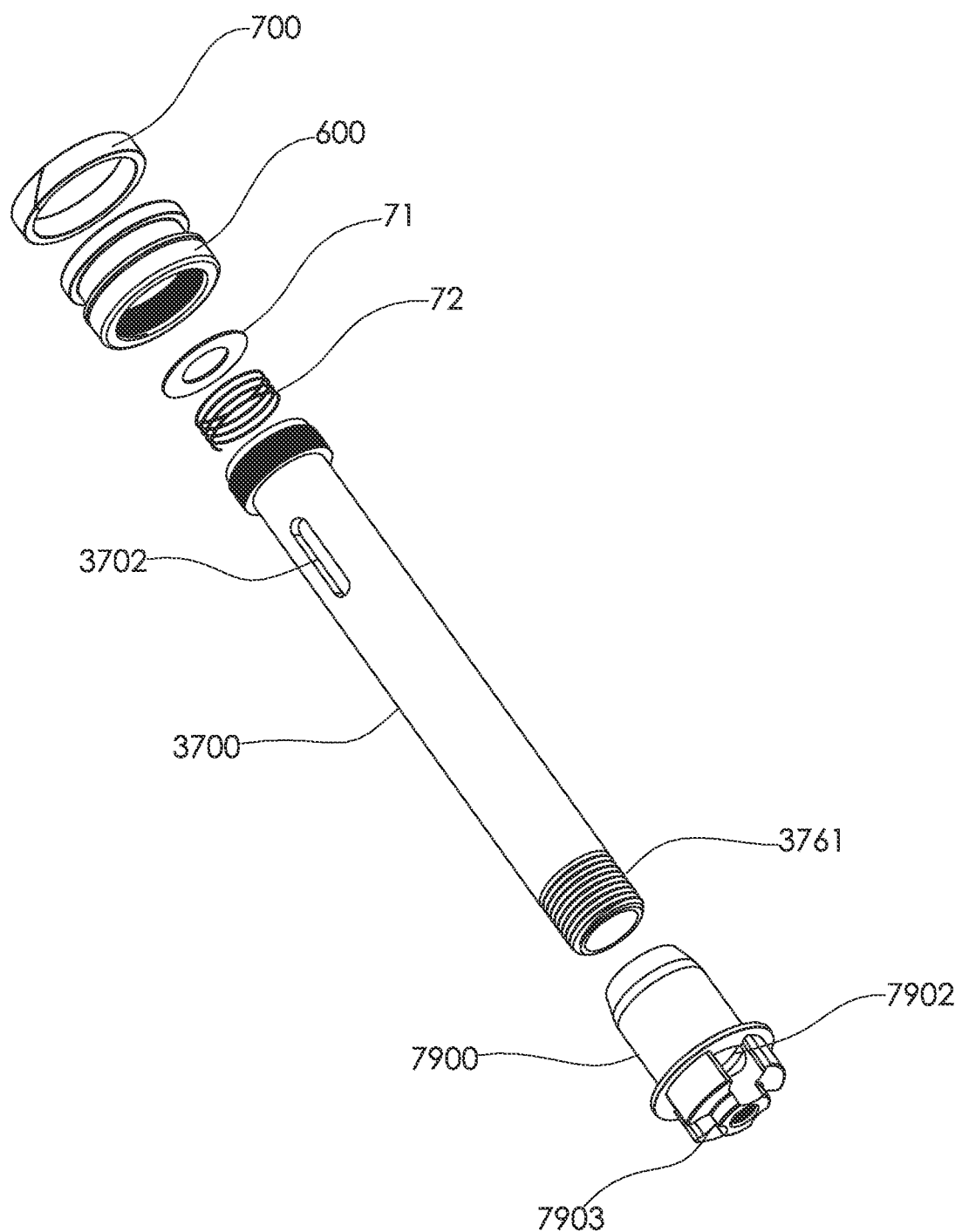
FIG. 9 is a perspective exploded view of the dampener rod assembly.

As seen in FIG. 9, an exploded view of the dampener rod assembly 3 shows a preferred construction. The dampener rod assembly 3 preferably includes the dampener rod 3700 which can be formed as an aluminum or stainless steel tube having an elongated longitudinal slot cut as the dampener rod inlet port 3702 and a threaded tip formed as dampener rod threads 3761. The dampener rod return valve 71 can be formed as a washer biased by a dampener rod return spring 72. The dampener rod piston 600 can attach to the dampener rod 3700. The dampener rod piston seal 700 can attach to the dampener rod piston 600. The bottom out cone 7900 can be machined from a cylindrical metal piece and threaded to attach to the dampener rod threads 3761. The bottom out cone 7900 preferably also has a bottom out cone entry port 7902 and a bottom out cone support 7903 formed at an end distal to the dampener rod threads 3761.

Figure 10:
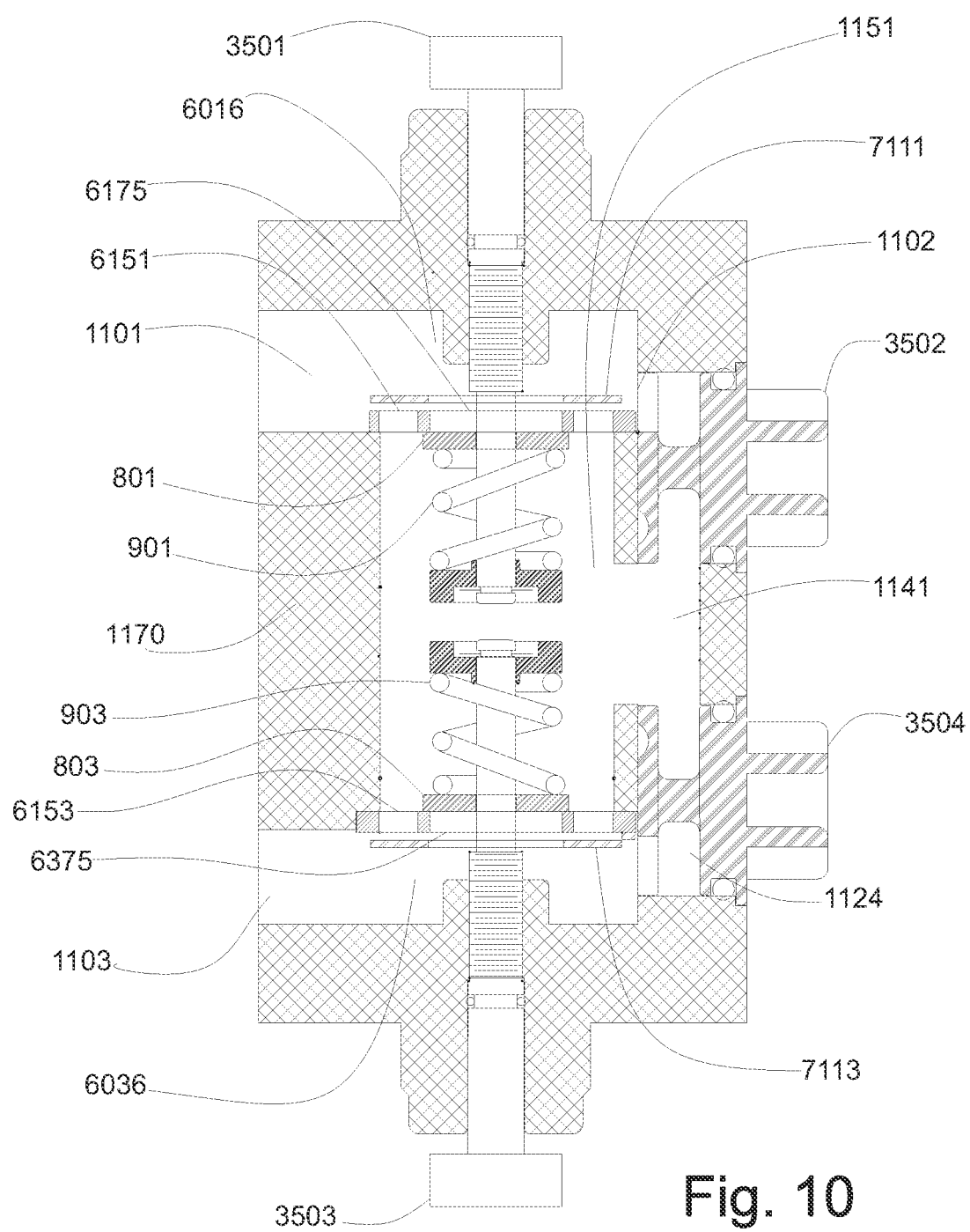
FIG. 10 is a cross-section diagram of the adjuster.
Figure 11:
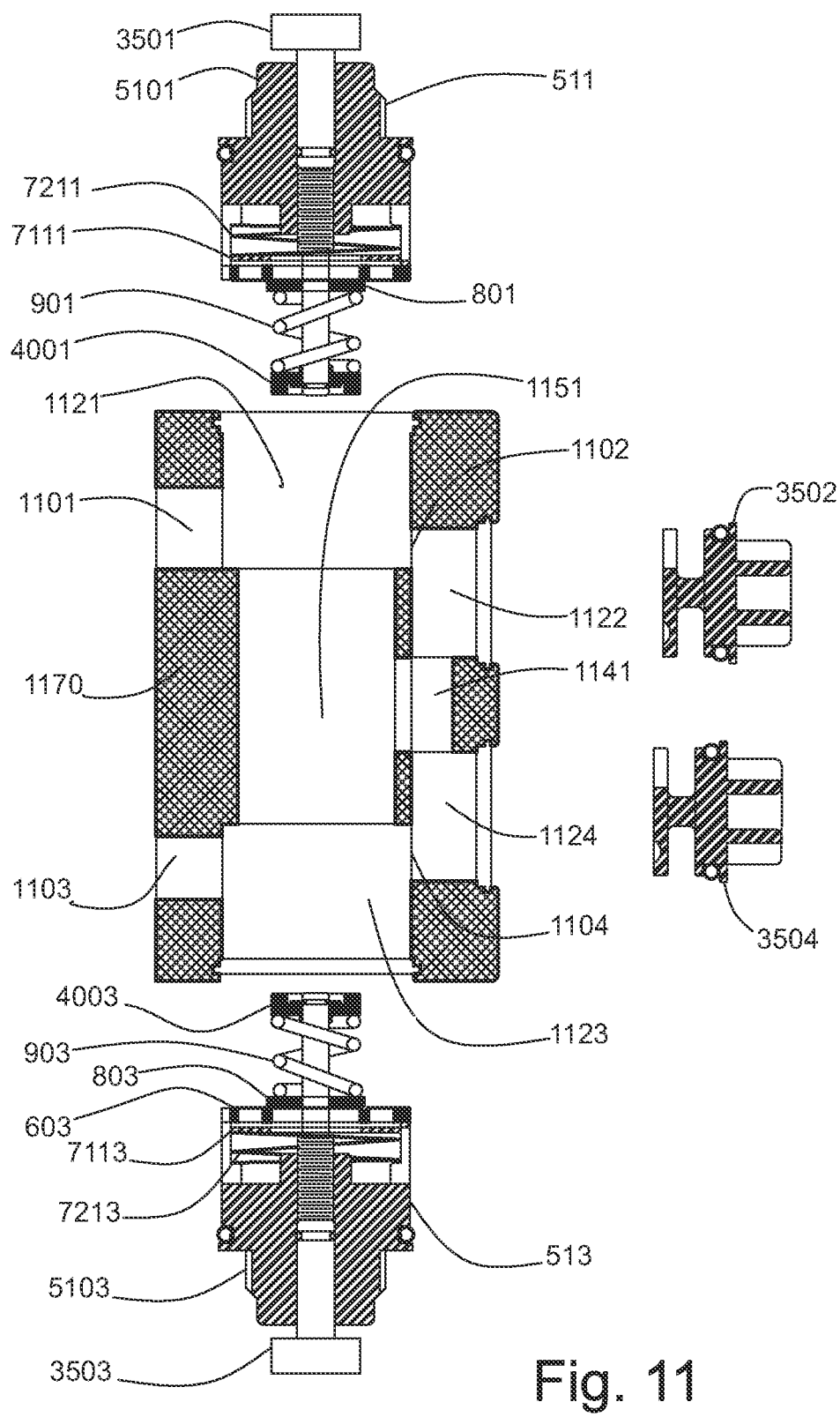
FIG. 11 is a cross-section exploded view diagram of the adjuster.

As seen in FIGS. 10-11, cross-section diagrams of the adjuster shows all of the major parts of the adjuster to show the assembly process. For example, the low speed compression cavity 1122 receives the low speed compression adjuster shaft 3502, and the low speed rebound cavity 1124 receives the low speed rebound adjuster shaft 3504.

Figure 12:
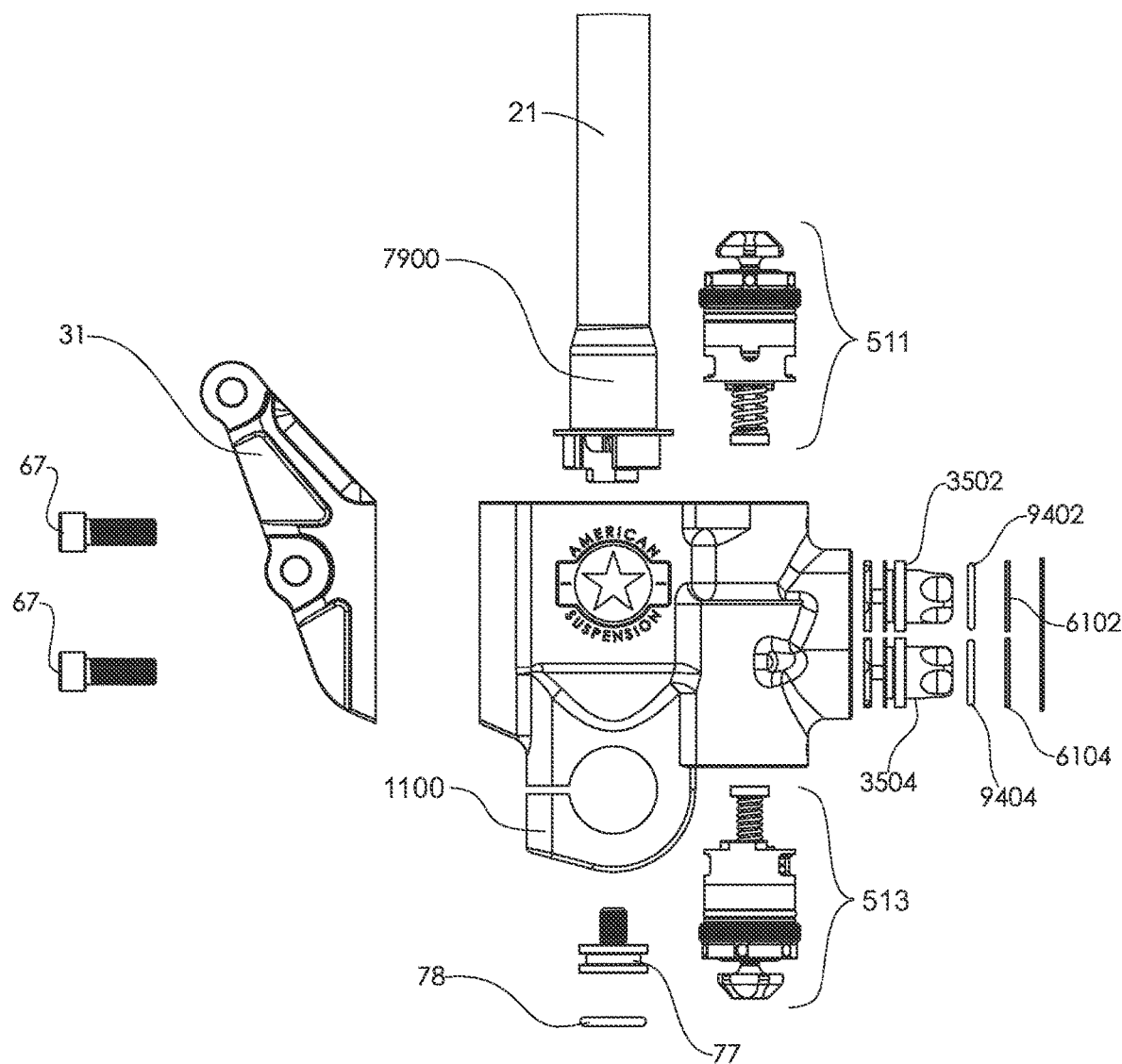
FIG. 12 is a side view exploded diagram of the body with adjuster.

As seen in FIG. 12, a side view exploded diagram of the body with adjuster shows the major subassemblies with the high speed compression adjuster 511 and the high speed rebound adjuster 513 formed as modular plug subassemblies that can be inserted into their respective sockets. The axle clamp 1100 clamps to the motorcycle such as at the motorcycle axle in a soft tail motorcycle where the motorcycle axle is pivotally suspended. The brake caliper mount bracket 31 can be retained to the brake caliper for additional rigidity via brake bracket bolts 67. The piston assembly is also a modular unit that fits within the axle clamp 1100.

The bottom out cone 7900 receives a bottom out cone retainer bolt 77 having a bottom out cone retainer bolt seal 78. The low speed compression adjuster shaft 3502 and the low speed rebound adjuster shaft 3504 fit in their respective sockets with a low speed compression adjuster seal 9402 and a low-speed rebound adjuster seal 9404. The low speed compression retainer 6102 and the low-speed rebound retainer 6104 respectively retain the low speed compression adjuster shaft 3502 and the low speed rebound adjuster shaft 3504.

The invention claimed is:

1. A suspension unit comprising:
   an adjuster; and a piston assembly connected to the adjuster, wherein the piston assembly includes:
   a. three or more concentric cylindrical bodies including:
      i. an outer tube;
      ii. an inner tube, wherein the inner tube is inside and concentric to the outer tube; and
      iii. a dampener rod, wherein the dampener rod is inside and concentric to the inner tube, wherein the outer tube is rigidly connected to the dampener rod, wherein the inner tube is telescopically mounted to the outer tube;
   b. a dampener rod piston, wherein the dampener rod piston is formed at one end of the dampener rod, wherein the dampener rod piston seals against an inside surface of the inner tube; wherein the dampener rod piston divides an internal volume of the inner tube into an inner tube reservoir, and a rebound chamber;
   c. a dampener rod seal, wherein the dampener rod seal is concentric to the inner tube and is fit around the dampener rod such that the dampener rod seal restricts a fluid flow from the rebound chamber; and
   d. an axle clamp, wherein the axle clamp caps an end of the outer tube opposite the inner tube reservoir, wherein the axle clamp closes off the outer tube and forms a compression chamber between the dampener rod seal and the axle clamp, wherein the dampener rod seal restricts fluid flow between the compression chamber and the rebound chamber;
   e. a dampener rod rebound passage and a dampener rod transfer chamber are formed internal to the dampener rod; and
   f. a dampener rod inlet port is formed as a port in the dampener rod and connects the dampener rod rebound passage to the rebound chamber;
   g. an axle clamp rebound port connects to the dampener rod rebound passage; and
   h. the dampener rod transfer chamber has an opening that connects to the compression chamber at one end and the dampener rod transfer chamber connects to the dampener rod piston ports at another; and
   i. the dampener rod piston ports connect to the inner tube reservoir; and
   j. a compression exit port passing from the compression chamber through the outer tube.

2. The suspension unit of claim 1, wherein the dampener rod has a dampener rod transfer chamber separate from the dampener rod rebound chamber and dampener rod chamber, wherein the dampener rod transfer chamber is connected at one end to the compression chamber by a dampener rod inlet port formed as an opening in the dampener rod wall; further comprising a dampener rod piston chamber formed as a hollow cavity, wherein an end closest to the inner tube reservoir has a dampener rod piston plate which has dampener rod piston ports, wherein an opposite end of the dampener rod transfer chamber connects into the dampener rod piston chamber; further comprising a thin disk washer, wherein the dampener rod return valve blocks fluid flow through the dampener rod piston ports from escaping the dampener rod piston chamber but freely allows entrance from the inner tube reservoir to the dampener rod piston chamber.

3. The suspension unit of claim 2, further comprising an over pressure port formed in the dampener rod piston plate; and an over pressure valve covers the over pressure port and is held in place by an over pressure bolt, wherein the over pressure valve releases excessively high pressure in the compression chamber, which escapes through the dampener rod piston volume into the inner tube reservoir.

4. The suspension unit of claim 1, further comprising an adjuster block wherein the compression exit port connects to the adjuster block at an adjuster block compression entry port, wherein the axle clamp rebound port connects to an adjuster block rebound entry port, wherein the adjuster block has a high-speed compression cavity formed on an end of the adjuster block, wherein the high-speed rebound cavity is formed on an opposite end of the adjuster block; further comprising an adjuster volume that both the high-speed compression cavity and the high-speed rebound cavity connect into, wherein the adjuster block compression entry port connects to the high-speed compression cavity.

5. The suspension unit of claim 4, wherein the adjuster block rebound entry port connects to the high-speed rebound cavity, wherein a low-speed compression entry port connects the high-speed compression cavity to the low-speed compression cavity; and further comprising:
   a low-speed rebound entry port, wherein the low-speed rebound entry port connects the high-speed rebound cavity to the low-speed rebound cavity;
   a low-speed return port, wherein the low-speed return port connects to the adjuster volume and both the low-speed compression cavity and the low-speed rebound cavity, wherein the low-speed compression cavity receives a low speed compression adjuster shaft, wherein the low speed compression adjuster shaft controls the fluid flow, wherein the low-speed rebound cavity receives a low speed rebound adjuster shaft, wherein the low speed rebound adjuster shaft controls the fluid flow; and
   a high-speed compression adjuster assembly inserted in the high-speed compression cavity; and a high-speed rebound adjuster assembly inserted in the high-speed rebound cavity.

6. The suspension unit of claim 5, wherein the high-speed compression adjuster assembly further includes: a high-speed compression adjuster shaft that passes coaxially through a high-speed compression adjuster body, wherein the high-speed compression adjuster shaft has a means for rotating about its longitudinal axis on one end and compression adjuster shaft threads along its mid-section, wherein the high-speed compression adjuster shaft threads engage high-speed compression adjuster body threads formed on the high-speed compression adjuster body.

7. A suspension unit according to claim 6, wherein the high-speed rebound cavity is offset from the high-speed compression cavity.

8. The suspension unit of claim 6, further comprising a high-speed compression valve spring fixed to a high-speed compression adjuster shaft on an end opposite the means for turning the adjuster shaft, wherein a high-speed compression valve spring is pre-compressed more or less depending on the position of high-speed compression adjuster shaft threads in high-speed compression adjuster body threads, wherein on another side of the high-speed compression valve spring, the high-speed compression valve spring presses a high-speed compression exit valve against a high-speed compression adjuster plate over a high-speed compression adjuster chamber exit port, wherein the high-speed compression adjuster chamber exit port is in the center of the high-speed compression adjuster plate formed on an end of the high-speed compression adjuster body furthest from a means for turning the high-speed compression adjuster shaft.

9. The suspension unit of claim 6, wherein the high-speed compression adjuster body is internally threaded and the high-speed compression adjuster shaft is externally threaded so that a high-speed compression valve spring pretension may be adjusted by the high-speed compression adjuster shaft, wherein when the high-speed compression adjuster shaft is rotated, the threads in the compression adjuster body cause the preload on the high-speed compression valve spring to change; further comprising a cavity formed between the high-speed compression adjuster body and the high-speed compression adjuster plate to create the compression adjuster chamber, wherein the compression adjuster chamber is bound on one side by the high-speed compression adjuster body and the other side by the high-speed compression adjuster plate.

10. The suspension unit of claim 9, wherein the high-speed compression adjuster plate is pressed against a centrally placed high-speed compression adjuster chamber exit port, and wherein around the outside of the high-speed compression adjuster plate are one or more compression plate return ports; a compression return valve sits inside the compression adjuster chamber, and on the high-speed compression adjuster plate, blocking flow out of the compression adjuster chamber through the one or more compression plate return ports; wherein the compression return valve is easily pushed back from the high-speed compression adjuster plate to allow flow into the compression adjuster chamber.

11. The suspension unit of claim 6, wherein the high-speed compression adjuster body has openings to allow fluids to transmit from the compression adjuster chamber to adjuster block compression entry port and low-speed compression entry port, wherein the high-speed rebound adjuster assembly further includes:
a high-speed rebound adjuster shaft that passes coaxially through a high-speed rebound adjuster body, wherein the high-speed rebound adjuster shaft is threaded to engage a high-speed rebound adjuster body;
a high-speed rebound valve spring, wherein the high-speed rebound valve spring is pre-compressed based on the high-speed rebound adjuster shaft; and
a high-speed rebound valve spring pressing a high-speed rebound adjuster plate over the high-speed rebound adjuster chamber exit port.

12. The suspension unit of claim 5, wherein the compression exit port connects to an adjuster block compression entry port and the axle clamp rebound port connects to an adjuster block rebound entry port, wherein the adjuster block has a high-speed compression cavity and a high-speed rebound cavity; further comprising an adjuster volume that both the high-speed compression cavity and the high-speed rebound cavity connect into, wherein the adjuster block compression entry port connects to the high-speed compression cavity, wherein the adjuster block rebound entry port connects to the high-speed rebound cavity, wherein a low-speed compression entry port connects the high-speed compression cavity to the low-speed compression cavity, wherein a low-speed rebound entry port connects the high-speed rebound cavity to the low-speed rebound cavity, wherein a low-speed return port connects to the adjuster volume and both the low-speed compression cavity and the low-speed rebound cavity, wherein into the low-speed compression cavity is placed a low speed compression adjuster shaft.

13. A suspension unit comprising:
a piston assembly connected to an adjuster, wherein the adjuster comprises:
a high-speed compression cavity formed as a cylindrical cavity on one end of an adjuster block, and wherein a high-speed rebound cavity is cylindrical cavity formed on another end of the adjuster block;
an adjuster volume that both the high-speed compression cavity and the high-speed rebound cavity connect into, an adjuster block compression entry port connects to the high-speed compression cavity;
an adjuster block rebound entry port that connects to the high-speed rebound cavity;
a low-speed compression entry port that connects the high-speed compression cavity to the low-speed compression cavity;
a low-speed rebound entry port that connects the high-speed rebound cavity to the low-speed rebound cavity;
a low-speed return port that connects to the adjuster volume and both the low-speed compression cavity and the low-speed rebound cavity;
a low speed compression adjuster shaft received within a low-speed compression cavity;
the low speed compression adjuster shaft meters the flow of oil either by using a series of orifices, or by restricting a fluid flow via reducing the size of the orifice;
a low speed rebound adjuster shaft received within a low-speed rebound cavity, wherein the low speed rebound adjuster shaft controls the fluid flow;
a high-speed compression adjuster assembly is placed in the high-speed compression cavity;
a high-speed rebound adjuster assembly is placed in the high-speed rebound cavity;
a high-speed compression adjuster shaft passing coaxially through a high-speed compression adjuster body, wherein the high-speed compression adjuster shaft is threaded to the high-speed compression adjuster body;
a high-speed compression valve spring fixed to the high-speed compression adjuster shaft, wherein the high-speed compression valve spring is pre-compressed depending on the high-speed compression adjuster shaft, wherein the high-speed compression valve spring presses a high-speed compression exit valve against an high-speed compression adjuster plate over the high-speed compression adjuster chamber exit port.

14. The suspension unit of claim 13 wherein: the high-speed compression adjuster body is internally threaded and the high-speed compression adjuster shaft is externally threaded so that the high-speed compression valve spring pretension may be adjusted by the high-speed compression adjuster shaft, when the high-speed compression adjuster shaft is rotated, the threads in the compression adjuster body cause the preload on the high-speed compression valve spring to change.

15. The suspension unit of claim 13, further comprising a cavity formed between the high-speed compression adjuster body and the high-speed compression adjuster plate to create the compression adjuster chamber, wherein the compression adjuster chamber is bound on one side by the high-speed compression adjuster body and the other side by the high-speed compression adjuster plate, wherein the compression return valve is easily pushed back from the high-speed compression adjuster plate to allow flow into the compression adjuster chamber; wherein the high-speed compression adjuster body has openings to allow fluid flow to pass from the compression adjuster chamber to adjuster block compression entry port and low-speed compression entry port.

16. The suspension unit of claim 15, further comprising a high-speed rebound adjuster assembly having:
   a. a high-speed rebound adjuster shaft that passes coaxially through a high-speed rebound adjuster body, wherein the high-speed rebound adjuster shaft is threaded to the high-speed rebound adjuster body;
   b. a high-speed rebound valve spring fixed to the high-speed rebound adjuster shaft, wherein the high-speed rebound valve spring is pre-compressed to an extent depending on a position of the high-speed rebound adjuster shaft, wherein the high-speed rebound valve spring presses a high-speed rebound exit valve against a high-speed rebound adjuster plate over the high-speed rebound adjuster chamber exit port.

17. The suspension unit of claim 16, wherein the high-speed rebound adjuster body is internally threaded and the high-speed rebound adjuster shaft is externally threaded so that a high-speed rebound valve spring pretension is adjustable by the high-speed rebound adjuster shaft, wherein when the high-speed rebound adjuster shaft is rotated, the threads in the rebound adjuster body cause the preload on the high-speed rebound valve spring to change.

18. The suspension unit of claim 17, further comprising a cavity formed between the high-speed rebound adjuster body and the high-speed rebound adjuster plate to create the rebound adjuster chamber, wherein the rebound adjuster chamber is bound on one side by the high-speed rebound adjuster body and the other side by the high-speed rebound adjuster plate.

19. A suspension unit comprising:
   an adjuster; and a piston assembly connected to the adjuster, wherein the piston assembly includes:
   a. three or more concentric cylindrical bodies including:
      i. an outer tube;
      ii. an inner tube, wherein the inner tube is inside and concentric to the outer tube; and
      iii. a dampener rod, wherein the dampener rod is inside and concentric to the inner tube, wherein the outer tube is rigidly connected to the dampener rod, wherein the inner tube is telescopically mounted to the outer tube;
   b. a dampener rod piston, wherein the dampener rod piston is formed at one end of the dampener rod, wherein the dampener rod piston seals against an inside surface of the inner tube; wherein the dampener rod piston divides an internal volume of the inner tube into an inner tube reservoir, and a rebound chamber;
   c. a dampener rod seal, wherein the dampener rod seal is concentric to the inner tube and is fit around the dampener rod such that the dampener rod seal restricts a fluid flow from the rebound chamber; and
   d. an axle clamp, wherein the axle clamp caps an end of the outer tube opposite the inner tube reservoir, wherein the axle clamp closes off the outer tube and forms a compression chamber between the dampener rod seal and the axle clamp, wherein the dampener rod seal restricts fluid flow between the compression chamber and the rebound chamber;
   e. a dampener rod rebound passage and a dampener rod transfer chamber are formed internal to the dampener rod; and
   f. a dampener rod inlet port is formed as a port in the dampener rod and connects the dampener rod rebound passage to the rebound chamber;
   g. an axle clamp rebound port connects to the dampener rod rebound passage; and
   h. the dampener rod transfer chamber has an opening that connects to the compression chamber at one end and the dampener rod transfer chamber connects to the dampener rod piston ports at another; and
   i. the dampener rod piston ports connect to the inner tube reservoir; and
   j. a compression exit port passing from the compression chamber through the outer tube;
   k. the compression exit port connects to the axle clamp rebound port and valving is provided to adjust the flow between the compression exit port and the axle clamp rebound port.

20. The suspension unit of claim 19, further comprising bottom out cone which is threaded to accept the dampener rod, said bottom out cone is also threaded to be held in the axle clamp by a bottom out cone retainer bolt.

* * * * *